US012710959B2

(12) United States Patent
Nakamura et al.

(10) Patent No.: US 12,710,959 B2
(45) Date of Patent: Aug. 18, 2026

(54) EXTRACTING ENTITY RELATIONSHIP DIAGRAMS FROM SOURCE CODE

(71) Applicant: INTERNATIONAL BUSINESS MACHINES CORPORATION, Armonk, NY (US)

(72) Inventors: Hiroaki Nakamura, Yokohama (JP); Kohichi Ono, Setagaya-ku (JP); Toshiaki Yasue, Sagamihara (JP); Nobuhiro Hosokawa, Yokohama (JP); Yukiko Hara, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 17/538,276

(22) Filed: Nov. 30, 2021

(65) Prior Publication Data

US 2023/0168884 A1 Jun. 1, 2023

(51) Int. Cl.
*G06F 8/73* (2018.01)
*G06F 16/242* (2019.01)

(52) U.S. Cl.
CPC ............ *G06F 8/73* (2013.01); *G06F 16/2433* (2019.01)

(58) Field of Classification Search
CPC ............................... G06F 8/73; G06F 16/2433
See application file for complete search history.

(56) References Cited

U.S. PATENT DOCUMENTS

| | | | | |
|---|---|---|---|---|
| 8,407,262 | B2 * | 3/2013 | Hsu | G06F 16/288 707/790 |
| 2006/0173865 | A1 * | 8/2006 | Fong | G06F 40/151 |
| 2007/0299872 | A1 * | 12/2007 | Bier | G06F 16/34 707/E17.093 |
| 2008/0133491 | A1 * | 6/2008 | Iwao | G06F 16/256 |

(Continued)

FOREIGN PATENT DOCUMENTS

CN 111563131 A 8/2020

OTHER PUBLICATIONS

Liquan Han et al., "Entity-Relationship semantic meta-model based on ontology," 2010 [retrieved on Feb. 5, 2025], 2010 International Conference on Computer Application and System Modeling (ICCASM 2010), pp. 219-222, downloaded from <url>:https://ieeexplore.ieee.org. (Year: 2010).*

(Continued)

*Primary Examiner* — S. Sough
*Assistant Examiner* — Stephen D Berman
(74) *Attorney, Agent, or Firm* — CHIP LAW GROUP

(57) ABSTRACT

A computer-implemented method is described for creating an entity relationship diagram. In one embodiment, the method for creating the entity relationship diagram can include analyzing programs to extract tables having references to SQL statements and call graphs. The method may further include counting a number of co-occurrences of pairs of tables having the references to SQL statements. Creating first edges based on the number of co-occurrences of pairs of tables having the references to SQL statements. The (Continued)

method may further include computing a shortest path lengths between two programs using pairs of tables in the call graphs based on a program to table use relationship. The method can further include creating second edges based on the shortest path lengths. The entity relationship diagram is plotted from the first edges and the second edges.

14 Claims, 8 Drawing Sheets

(56) References Cited

U.S. PATENT DOCUMENTS

| | | | | |
|---|---|---|---|---|
| 2011/0178974 | A1* | 7/2011 | Sayal | G06N 5/022 706/50 |
| 2012/0203660 | A1* | 8/2012 | Moritz | G06Q 30/02 705/26.7 |
| 2016/0055233 | A1* | 2/2016 | Wang | G06F 16/288 707/756 |
| 2017/0032249 | A1* | 2/2017 | Chougule | G06N 5/02 |
| 2017/0039040 | A1* | 2/2017 | Nayak | G06Q 10/06 |
| 2019/0005163 | A1* | 1/2019 | Farrell | G06F 16/9024 |
| 2020/0057788 | A1 | 2/2020 | Huang et al. | |
| 2022/0414098 | A1* | 12/2022 | Pini | G06F 16/24552 |

OTHER PUBLICATIONS

Gharib Gharibi et al., "Code2graph: Automatic Generation of Static Call Graphs for Python Source Code," 2018 [retrieved on Feb. 5, 2025], 33rd IEEE/ACM International Conference on Automated Software Engineering, pp. 880-885, downloaded from <url>:https:/ieeexplore.ieee.org. (Year: 2018).*

Ronak Dedhia et al., "Techniques to automatically generate Entity Relationship Diagram," Oct. 2015 [retrieved Aug. 24, 2025], International Journal of Innovations & Advancement in Computer Science, ISSN 2347-8616, vol. 4, Issue 10, pp. 68-73, downloaded at <url>:https://www.academia.edu. (Year: 2015).*

P.S. Dhabe et al., "Articulated Entity Relationship (AER) Diagram for Complete Automation of Relational Database Normalization," May 2010 [retrieved [Aug. 24, 2025], International Journal of Database Management Systems (IJDMS), vol. 2, No. 2, pp. 84-100, downloaded at <url>:https://www.academia.edu. (Year: 2010).*

Si-yu Tian et al., A Hybrid Shortest Path Algorithm for IKEA Warehousing System, 2017 [retrieved Aug. 24, 2025], 2017 2nd International Conference on Computational Modeling, Simulation and Applied Mathematics (CMSAM 2017), pp. 402-412, downloaded from <url> :https://scholar.archive.org. (Year: 2017).*

P. G. T. H. Kashmira et al., "Generating Entity Relationship Diagram from Requirement Specification based on NLP," 2018 [retrieved Dec. 3, 2025], 3rd International Conference on Information Technology Research, pp. 1-4, downloaded from <url>:https://ieeexplore.ieee.org. (Year: 2018).*

Michael Burch, "Graph-Related Properties for Comparing Dynamic Call Graphs" 2020 [retrieved Dec. 3, 2025], pp. 1-13, downloaded from <url>:https://www.sciencedirect.com/science/article/pii/S2590118420300277. (Year: 2020).*

William Davis et al., "The Information System Consultant's Handbook", 1998 [retrieved Mar. 24, 2026], The Information System Consultant's Handbook, pp. 195-204, downloaded from <url>:https://www.taylorfrancis.com/chapters/edit/10.1201/9781420049107-26/entity-relationship-diagrams-william-davis-david-yen. (Year: 1998).*

Mell, Peter, et al., "The NIST Definition of Cloud Computing," Sep. 2011, 7 pages.

Yeh, Dowming, et al., "Extracting entity-relationship diagram from a table-based legacy database," Journal of Systems and Software, May 2008, pp. 764-771, 81,5.

Anonymous, "Generating Unified Modeling Language (UML) Deployment Diagram from the Source Code," http://ip.com/IPCOM/000154305, Jun. 2007, 2 pages.

Nanthaamornphong, Aziz, et al., "Extracting uml class diagrams from object-oriented fortran: Foruml," Proceedings of the 1st International Workshop on Software Engineering for High Performance Computing in Computational Science and Engineering, Nov. 2013, pp. 9-16.

Alhajj, Reda, "Extracting the extended entity-relationship model from a legacy relational database," Information systems, Sep. 2003, pp. 597,618, 28,6.

Andersson, Martin, "Extracting an entity relationship schema from a relational database through reverse engineering," International Conference on Conceptual Modeling, Dec. 1994, pp. 403-419, Springer, Berlin, Heidelberg.

Al-Masree, Hala Khaled, "Extracting Entity Relationship Diagram (ERD) from relational database schema," International Journal of Database Theory and Application, Jun. 2015, pp. 15-26, 8,3.

* cited by examiner

| TABLE PAIR | # OF CO-OCCURRENCE |
|---|---|
| (POLICY, COMMERCIAL) | 4 |
| (POLICY, CLAIM) | 2 |
| (POLICY, ENDOWMENT) | 1 |
| (POLICY, HOUSE) | 1 |
| (POLICY, MOTOR) | 1 |

FIG. 4

| TABLE PAIR | LENGTH |
|---|---|
| (COMMERCIAL, CUSTOMER) | 3 |
| (CLAIM, CUSTOMER) | 3 |
| (ENDOWMENT, CUSTOMER) | 3 |
| (HOUSE, CUSTOMER) | 3 |
| (MOTOR, CUSTOMER) | 3 |
| (POLICY, CUSTOMER) | 3 |
| (CUSTOMER_SECURER, CUSTOMER) | 1 |
| (COMMERCIAL, CUSTOMER_SECURE) | 3 |
| (CLAIM, CUSTOMER_SECURE) | 3 |
| (ENDOWMENT, CUSTOMER_SECURE) | 3 |
| (HOUSE, CUSTOMER_SECURE) | 3 |
| (MOTOR, CUSTOMER_SECURE) | 3 |
| (POLICY, CUSTOMER_SECURE) | 3 |

FIG. 5

EXTRACTING ENTITY RELATIONSHIP DIAGRAMS FROM SOURCE CODE

BACKGROUND

The present disclosure generally relates to database tables, and more particularly to representing relationships among database tables used in applications for software maintenance, replacement of technology infrastructures and application modernization.

To represent relationships among database tables, such as those used in applications for software maintenance, replacement of technology infrastructures and application modernization, entity-relationship diagrams (ER diagrams) can be used. Entity-relationship diagrams (ER diagrams) are graphical models in which tables are mapped to graph nodes and table relationships are mapped to graph edges. A graph in this context is made up of vertices, which are also called nodes or points, that are connected by edges.

SUMMARY

In accordance with one aspect of the present disclosure, a computer-implemented method is described for creating an entity relationship diagram. In one embodiment, the method for creating the entity relationship diagram can include analyzing programs to extract tables having references to Structured Query Language (SQL) statements and call graphs. The method may further include counting a number of co-occurrences of pairs of tables having the references to SQL statements. Creating first edges based on the number of co-occurrences of pairs of tables having the references to SQL statements. The method may further include computing a shortest path lengths between two programs using pairs of tables in the call graphs based on a program to table use relationship. The method can further include creating second edges based on the shortest path lengths. The entity relationship diagram is plotted from the first edges and the second edges.

In another aspect, a system is described for generating an entity relationship diagram. In one embodiment, the system can include a hardware processor; and a memory that stores a computer program product. The computer program product when executed by the hardware processor, causes the hardware processor to analyze programs to extract tables having references to SQL statements and call graphs. The system may further count a number of co-occurrences of pairs of tables having the references to SQL statements. The system can create first edges based on the number of co-occurrences of pairs of tables having the references to SQL statements. The system may further include computing a shortest path lengths between two programs using pairs of tables in the call graphs based on a program to table use relationship. The system can further create second edges based on the shortest path lengths. The system can further plot entity relationship diagrams from the first edges and the second edges.

In yet another aspect, a computer program product is described for generating an entity relationship diagram. The computer program product can include a computer readable storage medium having computer readable program code embodied therewith. The program instructions executable by a processor to cause the processor to analyze programs to extract tables having references to SQL statements and call graphs. The computer program product may further count, using the processor, a number of co-occurrences of pairs of tables having the references to SQL statements. The computer program product can also create, using the processor, first edges based on the number of co-occurrences of pairs of tables having the references to SQL statements. The computer program product may further include computing, using the processor, a shortest path lengths between two programs using pairs of tables in the call graphs based on a program to table use relationship. The computer program product can further create, using the processor, second edges based on the shortest path lengths. The computer program product can further plot, using the processor, entity relationship diagrams from the first edges and the second edges.

BRIEF DESCRIPTION OF THE DRAWINGS

The following description will provide details of preferred embodiments with reference to the following figures wherein:

FIG. 4 is a table illustrating one example of a count of the number of co-occurrences of table pairs in a Structured Query Language (SQL) statement.

FIG. 5 is a table illustrating one example the shortest path length calculated between all table pairs.

DETAILED DESCRIPTION

Figure 1:
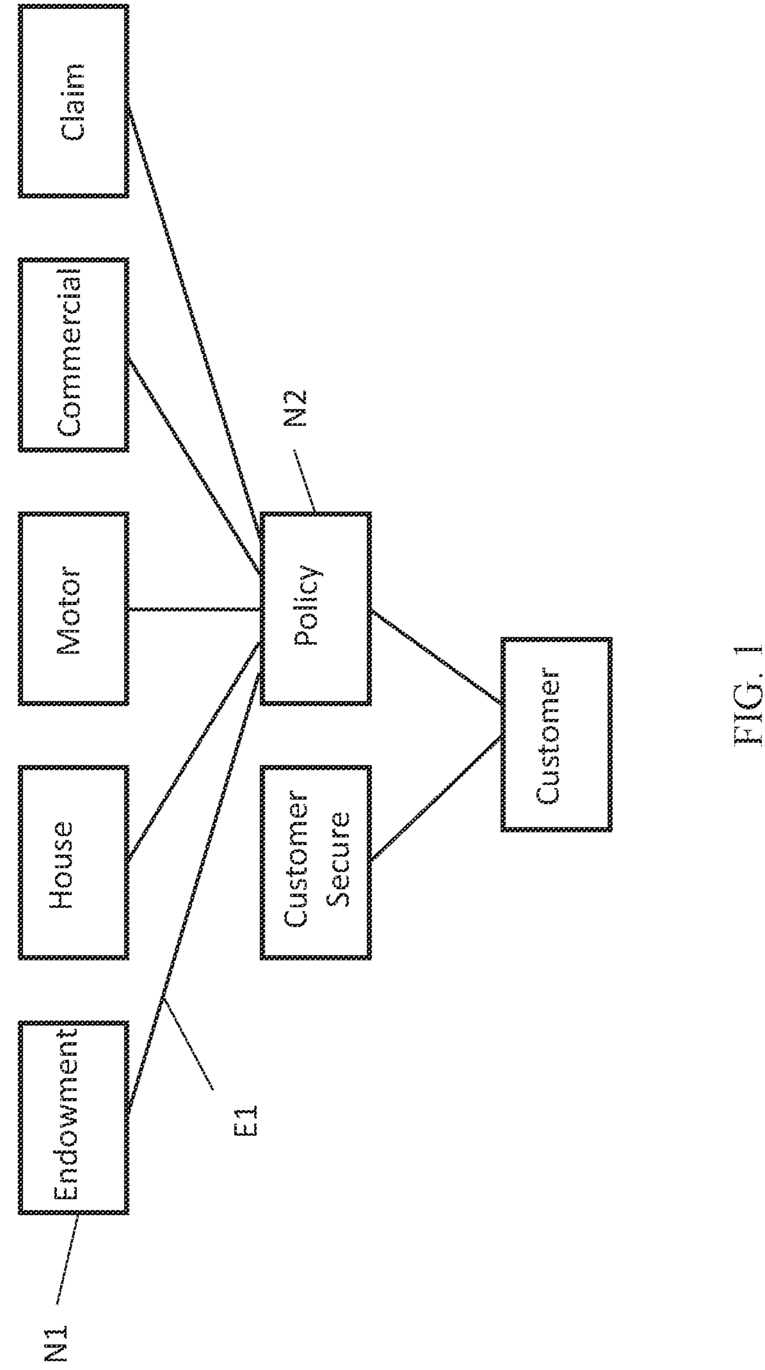
FIG. 1 illustrates one example of an entity-relationship (ER) diagram, in accordance with some embodiments of the present disclosure.

The methods, systems, and computer program products described herein relate to extracting entity relationship diagrams from source code. For developing software code, in the initial application development phase, database table relationships are designed in detail and captured accurately using entity relationship (ER) diagrams. FIG. 1 illustrates one example of an entity-relationship (ER) diagram 100. However, through the iterative source code changes over the years, the initial design documents become incorrect because of the resulting mismatch between the documents and source code. An entity relationship diagram (ERD), also known as an entity relationship model, is a graphical representation that depicts relationships among objects, places, concepts or events. The method, systems and computer program products provide for extracting ER diagrams from application source code where design documents are not available or correct. In some embodiments, the methods, systems and computer program products can extract ER diagram from application source code only. Source code is programming statements that are created by a programmer with a text editor or a visual programming tool and then saved in a file. The methods, systems and computer program products can be applied to fact scenarios, in which many changes were made against the source code and the initial design was lost. The methods, systems and computer program products are now described in greater detail with reference to FIGS. 1-8.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The methods, systems and computer program products extract entity-relationship diagrams from source code. FIG. 1 illustrates one example of an entity-relationship (ER) diagram 100. Entity-relationship diagrams (ER diagrams) are graphical models in which tables are mapped to graph nodes and table relationships are mapped to graph edges. A graph in this context is made up of vertices, which are also called nodes or points, that are connected by edges. As illustrated in FIG. 1, the edge E1 is between a set of connected nodes N1, N2. FIG. 1 illustrates only one example of an entity relationship diagram, and it is not intended that the present disclosure be limited to only this example. In FIG. 1, the nodes include the tables for the table pairs. For example, the nodes may include “endowment”, “house”, “motor”, “commercial”, “claim”, “customer service”, “policy” and “customer”.

The method can create edges based on the number of co-occurrences in the same Structured Query Language (SQL) statements. Structured Query Language (SQL) is a domain-specific language used in programming and designed for managing data held in a relational database management system, or for stream processing in a relational data stream management system. Database tables are objects that store all the data in a database. In a table, data is logically organized in a row-and-column format which is similar to a spreadsheet. Each row represents a unique record in a table, and each column represents a field in the record. The methods, systems and computer program products create edges based on co-occurrences, e.g., in the database tables for the SQL statement. In some embodiments, edge creation is controlled so that 1) many of the edges share a small number of endpoints, and 2) the number of edges is a constant multiple of the number of nodes.

The method also creates edges based on the shortest path length on the call graph of programs that use the tables from the SQL statement. A call graph (also known as a call multigraph) is a control-flow graph, which represents calling relationships between subroutines in a computer program. Each node represents a procedure and each edge indicates that procedure calls for a procedure. Thus, a cycle in the graph indicates recursive procedure calls. In some embodiments, edge creation is controlled so that 1) many of the edges share a small number of endpoints, and 2) the number of edges is a constant multiple of the number of nodes.

Figure 2:
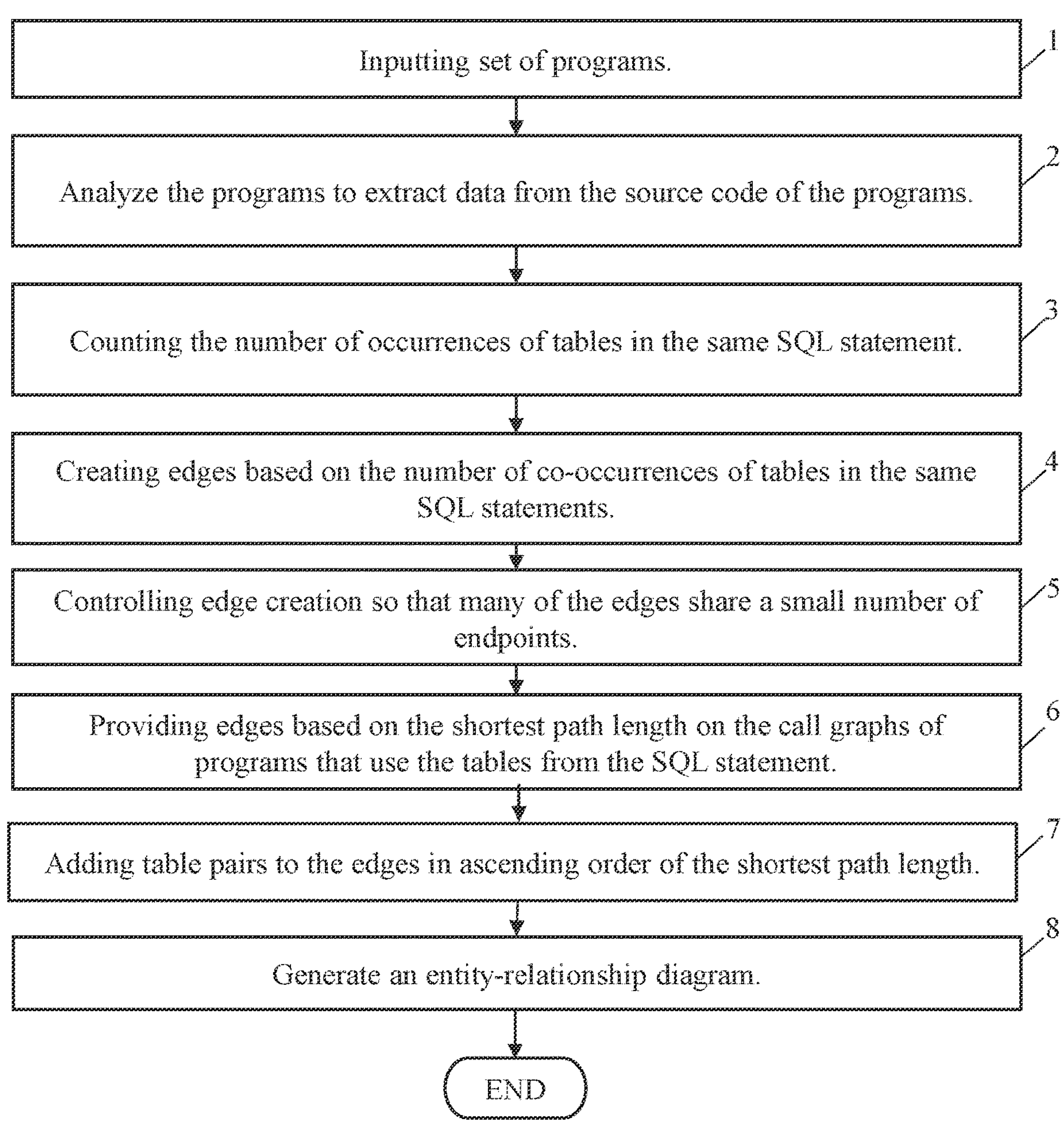
FIG. 2 is a detailed flow/block diagram showing one embodiment a method for extracting entity-relationship diagrams from source code, in accordance with some embodiments of the present disclosure.
Figure 3:
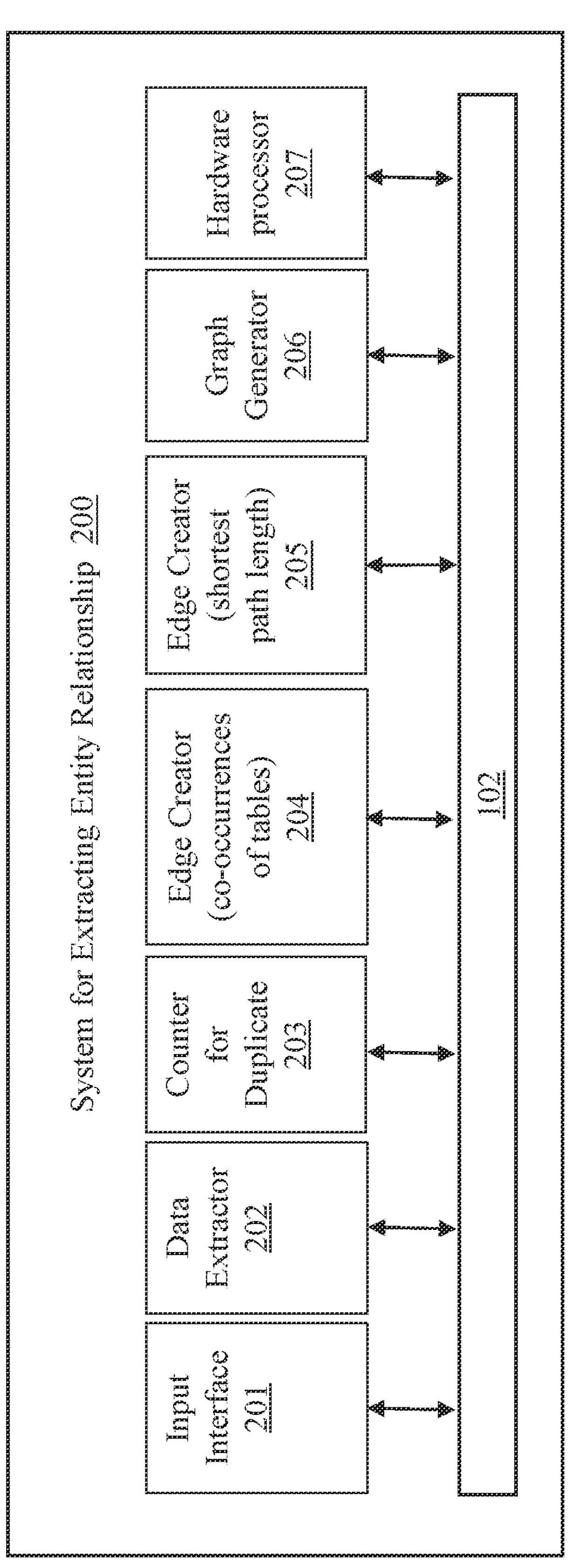
FIG. 3 is a block diagram depicting one embodiment of a system extracting entity-relationship diagrams from source code, in accordance with some embodiments of the present disclosure.
Figure 6:
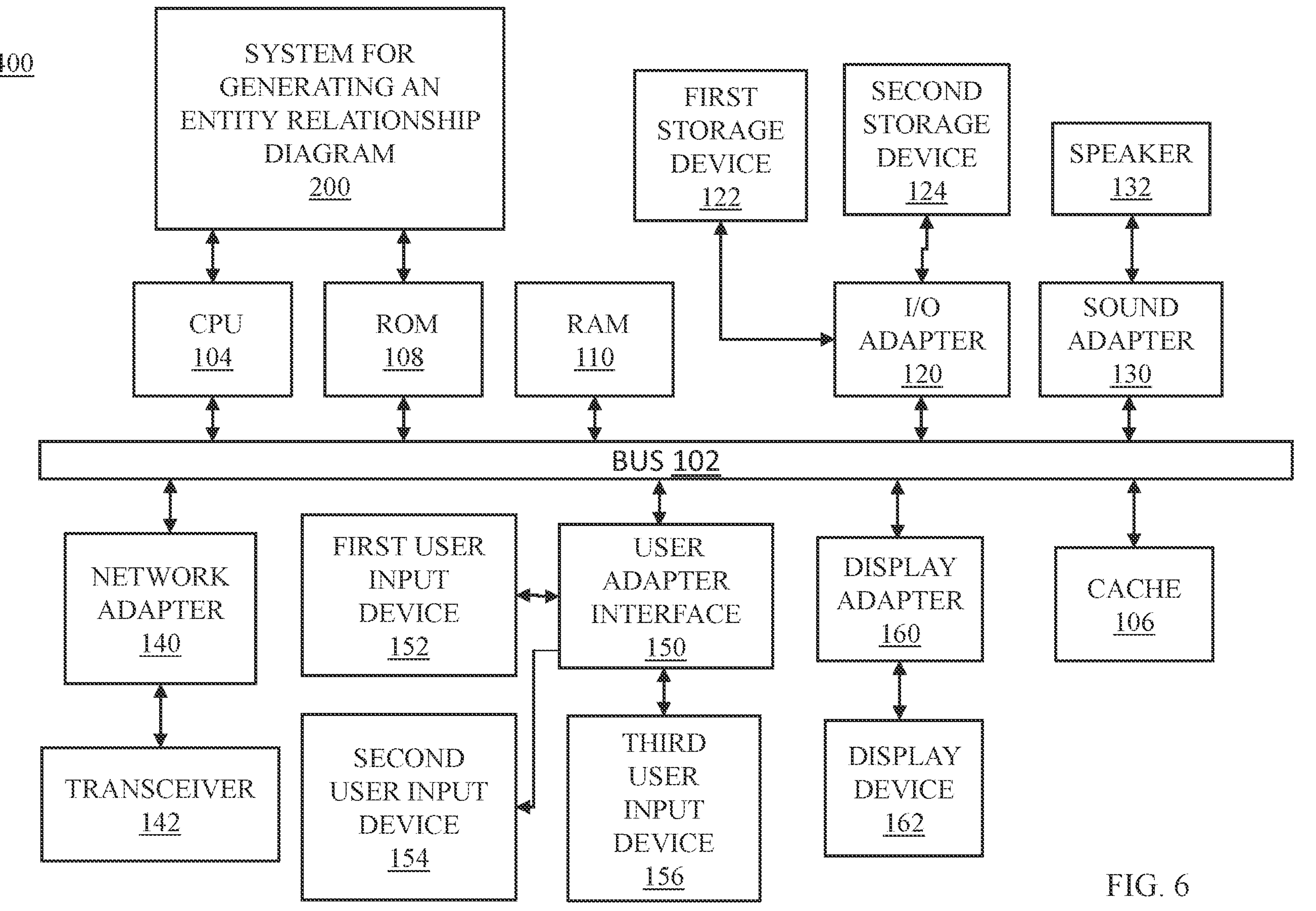
FIG. 6 is a block diagram illustrating a system that can incorporate the system for employing context across diverse artificial intelligence voice assistance systems that is depicted in FIG. 3, in accordance with one embodiment of the present disclosure.

FIG. 2 is a detailed flow/block diagram showing one embodiment a method for extracting entity-relationship diagrams from source code. FIG. 3 is a block diagram depicting one embodiment of a system extracting entity-relationship diagrams from source code, in accordance with some embodiments of the present disclosure.

Block 1 of FIG. 2 describes an initial step of a method for extracting entity-relationship diagrams from source code. The initial step at block 1 may include inputting the set of programs (P). The set of programs provide the source code from which data is extracted for providing the data for constructing the entity-relationship diagrams. The programs (P) that are employed as the input can be from an application. The application being analyzed for extracting the entity-relationship diagrams can include online transaction management and connectivity for insurance applications. The programs (P) have tables of data present therein. e.g., database tables for SQL statements corresponding to the programs (P). For example, the number of files being input can range from 40 files to 60 files. The input can also include a programming language, such as COBOL. The input at block 1 can also include the ratio for the number of edges to the number of nodes (r). In one example, the ration of the number of edges to the number of nodes is equal to 1.0.

FIG. 3 illustrates one embodiment of a system 200 for extracting entity relationship diagrams for source code. The system 200 may include an input interface 201. The input interface 201 provides the mechanism by which a user, e.g., a user desiring the entity relationship diagrams, can upload into the system the programs (P) for the applications. In some embodiments, the interface 201 provides a user interface through which the user provides data to the system 200.

Referring back to the method depicted in FIG. 2, the method may continue at block 2, which includes analyzing the programs (P) to extract data from the source code of the programs. Extracting the data from the source code may include analyzing the programs (P) to:

extract tables used in the programs: T;

extract SQL statement in the programs: Q;

extract tables referenced by each of the SQL statements: $S \subseteq Q \times 2^T$;

extract program-to-program call relationships: $C \subseteq P \times P$; and extract program to table use relationships: $R \subseteq P \times T$.

Block 2 may include initializing a set of undirected edges: E:={ }.

Referring to FIG. 3, the system 200 for extracting entity relationship diagrams for source code may include a source code data extractor 202. The source code data extractor 202 may perform the steps described in block 2 using cognitive technologies, such as artificial intelligence.

In one example, in which the application is an insurance application, the tables (T) extracted from the programs can include policy, commercial, claim, endowment, house, motor, and customer_secure, etc. For example, in the aforementioned example, in which 8 tables are used in the programs (policy, commercial, claim, endowment, house, motor, and customer_secure), the count may be on the order of 33 SQL statements in programs, 42 references in SQL statements, 56 program to program call relationships and 43 program to table relationships. The present disclosure is not intended to be limited to only this example.

Block 3 of the method illustrated in FIG. 2 may include for each table pair ($t_i$, $t_j$), a count is performed for the number of occurrences of tables in the same SQL statement. In the above example, in which 8 tables were extracted from a program, such as policy, commercial, claim, endowment, house, motor, and customer_secure), the count for the number of co-occurrences of table pairs in SQL can be as is illustrated in FIG. 4.

Referring to FIG. 3, the system 200 for extracting entity relationship diagrams for source code may include a counter for duplicates within table 203. The counter for duplicates within table 203 may perform the steps described in block 3.

Block 4 may include creating edges based on the number of co-occurrences of tables in the same SQL statement. In block 4 of the method illustrated in FIG. 2, add the table pairs to the edges E in the descending order of the number of co-occurrences in the tables references by each SQL statement (S=the number of co-occurrences in the tables references by each SQL statement). As illustrated in FIG. 1, the edges E1 are between a set of connected nodes N1, N2.

If there exists multiple table pairs of the same number of co-occurrences, one pair is selected using a Sub-Procedure having inputs: 1) Tables used in programs: T; 2) the set of non-directed edge created: E; and 3) the set of candidate table pairs: N. The set of candidate table pairs is the number when multiple table pairs are detected. For when multiple table pairs are detected, the following sequence provides the order in which table pairs are assigned to edges. For each table in the program (T), the number of sets of undirected edges (E's) element edges are counted where the table is used as their endpoints. For each table in the program (T) in descending order of the number of usage, check if the table is used as the endpoint of a table pair in the set of candidate table pairs (N). If the table is used, return the table pair for being included in the sequence of table pairs added to the edges in descending order at block 4. If not, the next table in the tables for the program (T) is considered, and a check is performed to see if the table is used as the endpoint of a table pair in the set of candidate table pairs (N). This loop continues until all of the tables in set of candidate table pairs (N) is added to the edges E in the descending order of the number of co-occurrences in the tables references by each SQL statement at block 4.

In one example, adding the edge set in the descending order of the number of co-occurrences is as follows: E={(POLICY, COMMERCIAL)(POLICY, CLAIM)(POLICY, ENDOWMENT)(POLICY, HOUSE), (POLICY, MOTOR)}.

Referring to FIG. 3, the system 200 for extracting entity relationship diagrams for source code may include an edge creator 204 based on the number of co-occurrences of tables. The edge creator 204 based on the number of co-occurrences of tables may perform the steps described in block 4.

In some embodiments, the methods, systems and computer program products create edges based on co-occurrences. e.g., in the database tables for the SQL statement. However, in some embodiments, edge creation is controlled so that 1) many of the edges share a small number of endpoints, and 2) the number of edges is a constant multiple of the number of nodes.

At block 5, controlling edge creating so that many of the edges share a small number of endpoints is controlled by maintaining the condition:

$$|E| < |T| \cdot r, \qquad \text{Condition 1}$$

in which E is the number of edges. T is the number of tables from the programs and r is the ration of the number of edges to the number of nodes. At block 5, if condition 1 is not maintained (identified in FIG. 2 as NO) and the number of edges share a greater number of predefined endpoints (e.g., common occurrences in the Tables) than permitted, the method may go to block 8. At block 5, if condition 1 is maintained (identified in FIG. 2 as YES) and the number of edges share a permitted number of predefined endpoints (e.g., common occurrences in the Tables) or less, the method may continue to block 6.

Block 6 can provide for providing edges based on the shortest path length on the call graph of programs that use the tables from the SQL statement.

Referring to block 6 of FIG. 2, the method may continue with constructing an undirected call graph from the program to program call relationship, e.g., $C \subseteq P \times P$, that was extracted from the data at block 2. An undirected graph is graph, i.e., a set of objects (called vertices or nodes) that are connected together, where all the edges are bidirectional. An undirected graph is sometimes called an undirected network. In contrast, a graph where the edges point in a direction is called a directed graph. A call graph (also known as a call multigraph) is a control-flow graph, which represents calling relationships between subroutines in a computer program. Each node represents a procedure and each edge indicates that procedure calls for a procedure.

For each table pairs ($t_i$, $t_j$), compute the length of the shortest path between two programs that use ti, and tj by using program to table use relationships ($R \subseteq P \times T$), and the call-graph. The path length is 0 if $t_i$ and $t_j$ are used by the same program. The path length is infinity if programs are not connected by the call-graph. In some embodiments, to compute the shortest path length, any algorithm for finding the shortest paths between nodes in a graph may be employed, such as Dijkstra's algorithm.

FIG. 5 illustrates a table including an example of the shortest path length between all table pairs.

At block 7 of FIG. 2, the method may continue with adding table pairs to the edges E in the ascending order of the shortest path length. For example, consistent with example illustrated in FIG. 5, the method would add to the edges the table pair: CUSTOMER, CUSTOMER_SECURE. In the example illustrated in FIG. 5, the table pair CUSTOMER, CUSTOMER_SECURE has a path length of 1, which is the minimum.

As illustrated in FIG. 1, the edges E1 are between a set of connected nodes N1, N2. If there exists multiple table pairs of the shortest path length, select one pair using Sub-Procedure having inputs: 1) Tables used in programs: T; 2) the set of non-directed edge created: E; and 3) the set of candidate table pairs: N. The set of candidate table pairs is the number when multiple table pairs of the shortest path length are detected. For when multiple table pairs of the shortest path length are detected, the following sequence provides the order in which table pairs are assigned to edges. For each table in the program (T), the number of sets of undirected edges (E's) element edges are counted where the table is used as their endpoints. For each table in the program (T) in descending order of the number of usage, check if the table is used as the endpoint of a table pair in the set of candidate table pairs (N). If the table is used, return the table pair of the shortest path length for being included in the sequence of table pairs added to the edges in descending order at block 4. If not, the next table in the tables for the program (T) is considered, and a check is performed to see if the table is used as the endpoint of a table pair in the set of candidate table pairs (N). This loop continues until all of the tables in set of candidate table pairs of the shortest path length (N) is added to the edges E in the ascending order of the multiple table pairs of the shortest path length at block 7.

Referring to the example depicted in FIG. 5, among the twelve (12) family pairs of the same path length 3, the method can select (POLICY, CUSTOMER) and (POLICY, CUSTOMER_SECURE) using the sub-procedure and add the two pairs to the edges E of the Entity Relationship Graph. The procedure selects these entities because their endpoint POLICY appears most in the edges E.

In some embodiments, the methods, systems and computer program products create edges based on the shortest path length on the call graph of programs that use the tables from the SQL statement. However, in some embodiments, edge creation is controlled so that 1) many of the edges share a small number of endpoints, and 2) the number of edges is a constant multiple of the number of nodes.

At block 7, controlling edge creating so that many of the edges share a small number of endpoints is controlled by maintaining the condition:

$$|E| < |T| \cdot r, \qquad \text{Condition 1}$$

in which E is the number of edges. T is the number of tables from the programs and r is the ration of the number of edges to the number of nodes. At block 7, if condition 1 is not maintained and the number of edges share a greater number of predefined endpoints than permitted, the method may go to block 8.

Referring to FIG. 3, the system 200 for extracting entity relationship diagrams for source code may include an edge creator 205 based on the shortest path length. The edge creator 204 based on shortest path length may perform the steps described in block 7.

Block 8 of FIG. 2 may generate an entity-relationship diagrams from source code. The output being the set of edges, e.g., produced at blocks 4 and 7, as well as the set of tables (T), which were extracted as data from programs. This can include plotting the graphs for the entity-relationship diagrams on a user interface display. In further embodiment, plotting can include an output from the system to plotting apparatus for producing a physical plot.

Referring to the Example depicted in FIGS. 4 and 5, because the condition $|E|<|T|\cdot r|E|$ is not satisfied, the method can output the tables and edges, and terminate. The output tables T can be equal to {POLICY, COMMERCIAL, CLAIM, ENDOWMENT, HOUSE, MOTOR, CUSTOMER, CUSTOMER_SECURE}, The edges can be equal to {(POLICY, COMMERCIAL)(POLICY, CLAIM) (POLICY, ENDOWMENT)(POLICY, HOUSE), (POLICY, MOTOR), (CUSTOMER, CUSTOMER_SECURE), (POLICY, CUSTOMER), (POLICY, CUSTOMER_SECURE)}.

Referring to FIG. 3, the system 200 for extracting entity relationship diagrams for source code may include a graph creator 206 that generates the relationship diagrams produced by the edge creator 204 based on the number of co-occurrences of tables and edge creator 205 based on the shortest path length.

FIG. 3 is a block diagram depicting one embodiment of a system is described for generating an entity relationship diagram. In one embodiment, the system can include a hardware processor 207; and a memory that stores a computer program product. The computer program product when executed by the hardware processor, causes the hardware processor to analyze programs to extract tables having references to SQL statements and call graphs. The system may further count a number of co-occurrences of pairs of tables having the references to SQL statements. The system can create first edges based on the number of co-occurrences of pairs of tables having the references to SQL statements. The system may further include computing a shortest path lengths between two programs using pairs of tables in the call graphs based on a program to table use relationship. The system can further create second edges based on the shortest path lengths. The system can further plot entity relationship diagrams from the first edges and the second edges.

Figure 7:
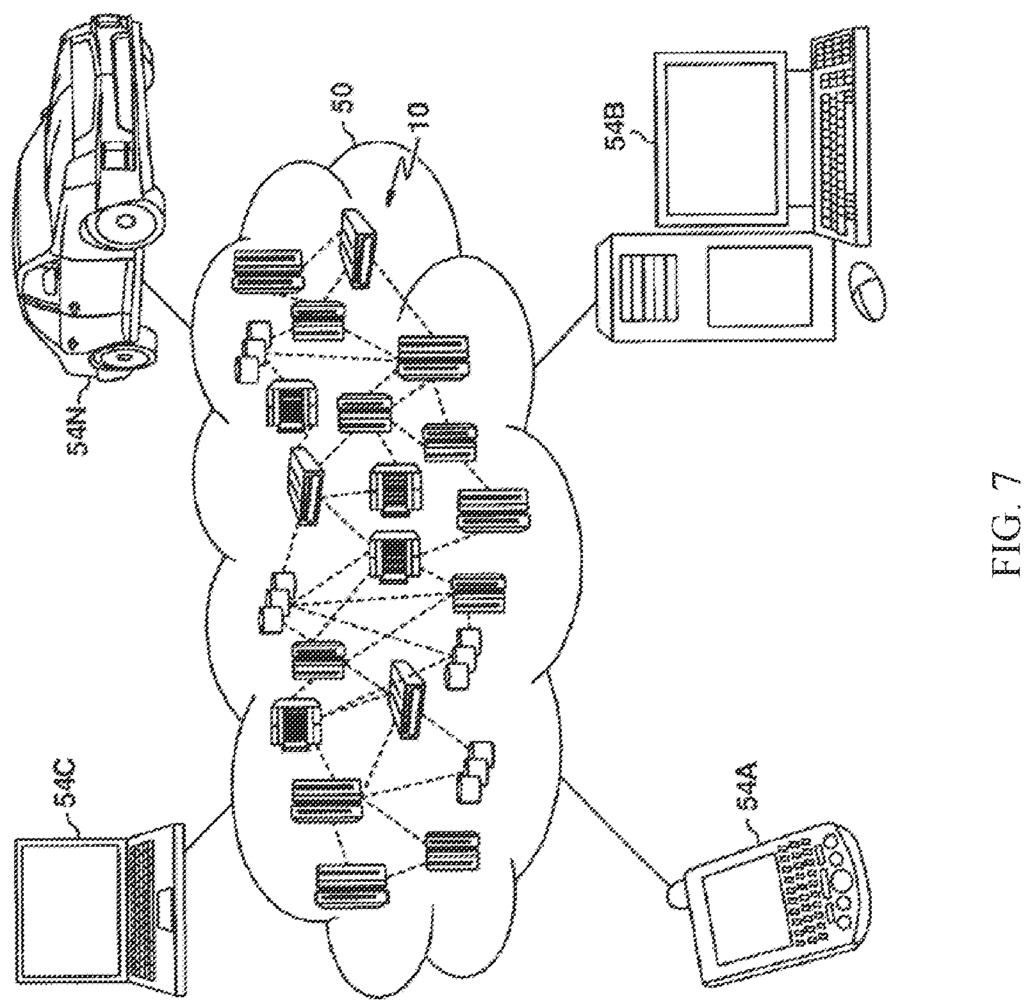
FIG. 7 depicts a cloud computing environment according to an embodiment of the present disclosure.

FIG. 7 illustrates a processing system 400 used by or comprised by the system for generating an entity relationship diagram 200 in accordance with the methods and systems described above in FIGS. 1-6. The bus 102 interconnects the plurality of components for the system 100 described above with the components depicted in the computer system 400 depicted in FIG. 5.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 7 shows the computer system 400 as a particular configuration of hardware and software, any configuration of hardware and software, as would be known to a person of ordinary skill in the art, may be utilized for the purposes stated supra in conjunction with the particular computer system 200 of FIG. 3. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for generating an entity relationship diagram. The non-transitory computer readable program when executed on a computer causes the computer to perform the steps of analyzing programs to extract tables having references to SQL statements and call graphs. The computer program product may further count, using the processor, a number of co-occurrences of pairs of tables having the references to SQL statements. The computer program product can also create, using the processor, first edges based on the number of co-occurrences of pairs of tables having the references to SQL statements. The computer program product may further include computing, using the processor, a shortest path lengths between two programs using pairs of tables in the call graphs based on a program to table use relationship. The computer program product can further create, using the processor, second edges based on the shortest path lengths. The computer program product can further plot, using the processor, entity relationship diagrams from the first edges and the second edges.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 8:
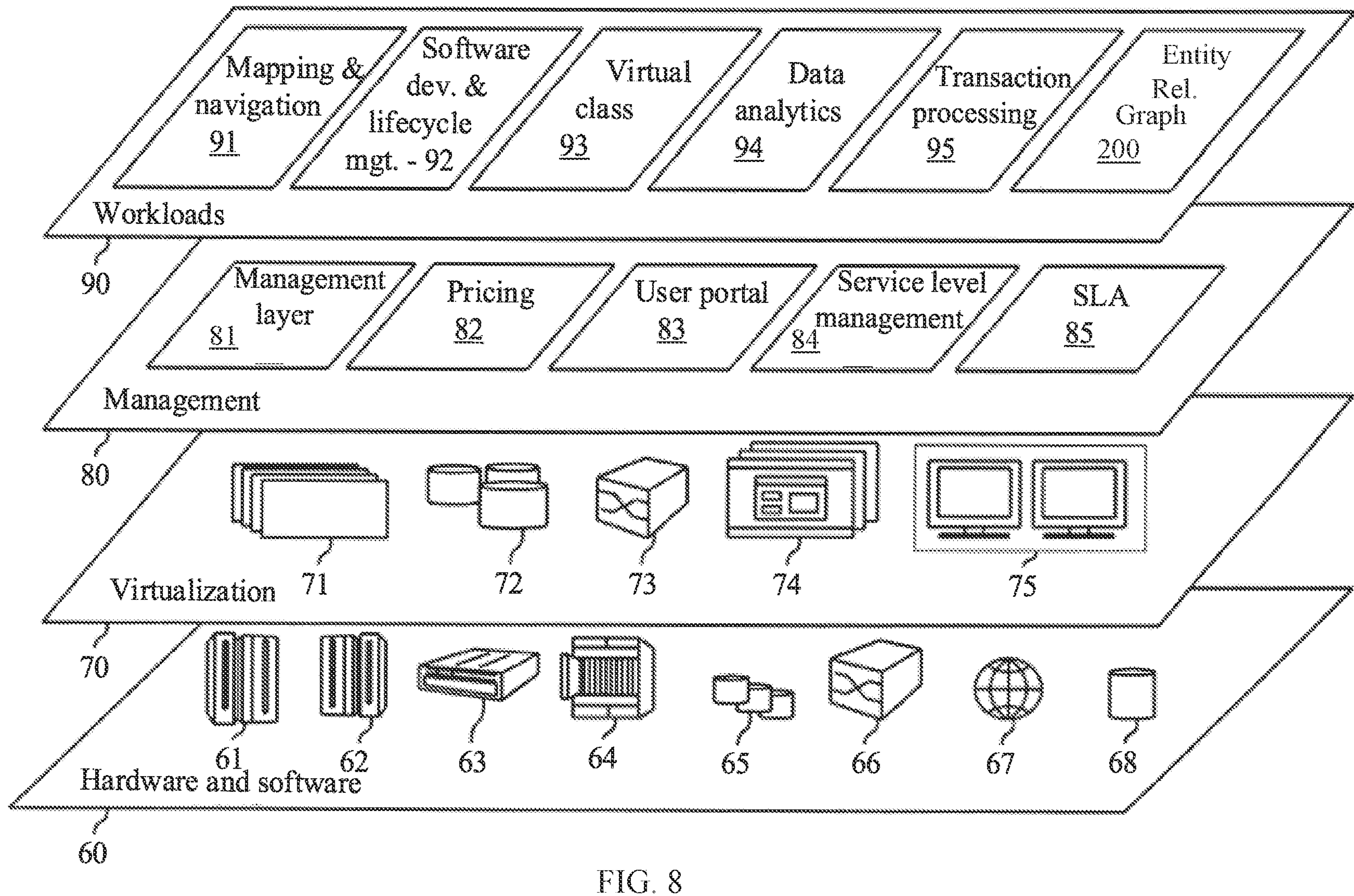
FIG. 8 depicts abstraction model layers according to an embodiment of the present disclosure.

Referring now to FIG. 8, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for generating an entity relationship diagram 200, in accordance with FIGS. 1-8.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method for creating an entity relationship diagram comprising:

analyzing programs to extract tables having references to structured query language (SQL) statements and call graphs;

counting a number of co-occurrences of pairs of tables having the references to the SQL statements;

creating first edges based on the number of co-occurrences of pairs of tables having the references to SQL statements;

computing a shortest path lengths between two programs using pairs of tables in the call graphs based on a program to table use relationship;

creating second edges based on the shortest path lengths;

plotting the entity relationship diagram from the first edges and the second edges; and utilizing the entity relationship diagram to perform software maintenance of the programs based on a mismatch between source code of the programs and initial design documents, the mismatch resulting from changes in the source code.

2. The computer-implemented method of claim 1, wherein the creating first edges based on the number of co-occurrences of the pairs of tables having the references to the SQL statements comprises controlling first edge creation to provide that a greater number of edges share a lesser number of nodes.

3. The computer-implemented method of claim 2, wherein the controlling of the first edge creation includes that the number of edges is a constant multiple of the number of nodes.

4. The computer-implemented method of claim 1, wherein the creating the second edges based on the shortest path lengths comprises controlling second edge creation to provide that a greater number of edges share a lesser number of nodes.

5. The computer-implemented method of claim 4, wherein the controlling of the second edge creation includes that the number of edges is a constant multiple of the number of nodes.

6. The computer-implemented method of claim 1, wherein the plotting the entity relationship diagram from the first edges and the second edges further comprises outputting the pairs of tables between the first edges and the second edges.

7. A system for generating an entity relationship diagram comprising:

a hardware processor; and a memory that stores a computer program product, the computer program product when executed by the hardware processor, causes the hardware processor to:

analyze programs to extract tables having references to structured query language (SQL) statements and call graphs;

count a number of co-occurrences of pairs of tables having the references to the SQL statements;

create first edges based on the number of co-occurrences of pairs of tables having the references to SQL statements;

compute a shortest path lengths between two programs using pairs of tables in the call graphs based on a program to table use relationship;

create second edges based on the shortest path lengths;

plot the entity relationship diagram from the first edges and the second edges; and utilize the entity relationship diagram to perform software maintenance of the programs based on a mismatch between source code of the programs and initial design documents, the mismatch resulting from changes to the source code.

8. The system of claim 7, wherein the creating first edges based on the number of co-occurrences of the pairs of tables having the references to the SQL statements comprises controlling first edge creation to provide that a greater number of edges share a lesser number of nodes.

9. The system of claim 8, wherein the controlling of the first edge creation includes that the number of edges is a constant multiple of the number of nodes.

10. The system of claim 7, wherein the creating the second edges based on the shortest path lengths comprises controlling second edge creation to provide that a greater number of edges share a lesser number of nodes.

11. The system of claim 10, wherein the controlling of the second edge creation includes that the number of edges is a constant multiple of the number of nodes.

12. The system of claim 7, wherein the plotting the entity relationship diagram from the first edges and the second edges further comprises outputting the pairs of tables between the first edges and the second edges.

13. A computer program product for generating an entity relationship diagram, the computer program product comprising a computer readable storage medium having computer readable program code embodied therewith, the program code executable by a processor to cause the processor to:

analyze, using the processor, programs to extract tables having references to structured query language (SQL) statements and call graphs;

count, using the processor, a number of co-occurrences of pairs of tables having the references to SQL statement;

create, using the processor, first edges based on the number of co-occurrences of pairs of tables having the references to SQL statements;

calculate, using the processor, a shortest path lengths between two programs using pairs of tables in the call graphs based on a program to table use relationship;

create, using the processor, second edges based on the shortest path lengths;

plot, using the processor, the entity relationship diagram from the first edges and the second edges; and utilize the entity relationship diagram to perform software maintenance of the programs based on a mismatch between source code of the programs and initial design documents, the mismatch resulting from changes to the source code.

14. The computer program product of claim 13, wherein the plotting the entity relationship diagram from the first edges and the second edges further comprises outputting the pairs of tables between the first edges and the second edges.

* * * * *